April 5, 1955  A. W. STAUFFER  2,705,339
TENDON EXTRACTOR FOR FOWL
Filed Jan. 6, 1953  2 Sheets-Sheet 1
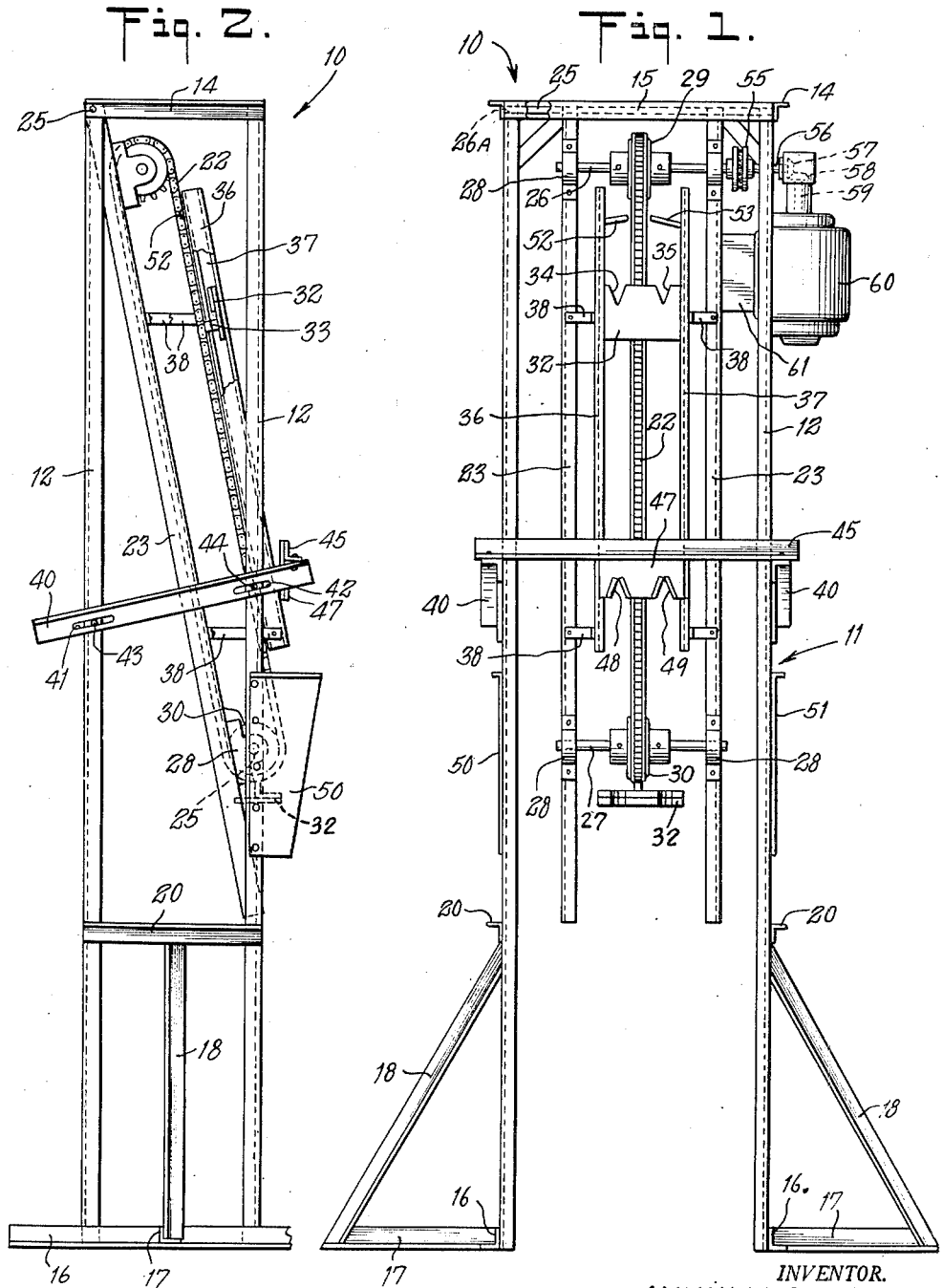
INVENTOR.
AMMON W. STAUFFER
BY
Howard J. Jeandron
ATTORNEY April 5, 1955  A. W. STAUFFER  2,705,339
TENDON EXTRACTOR FOR FOWL
Filed Jan. 6, 1953  2 Sheets-Sheet 2
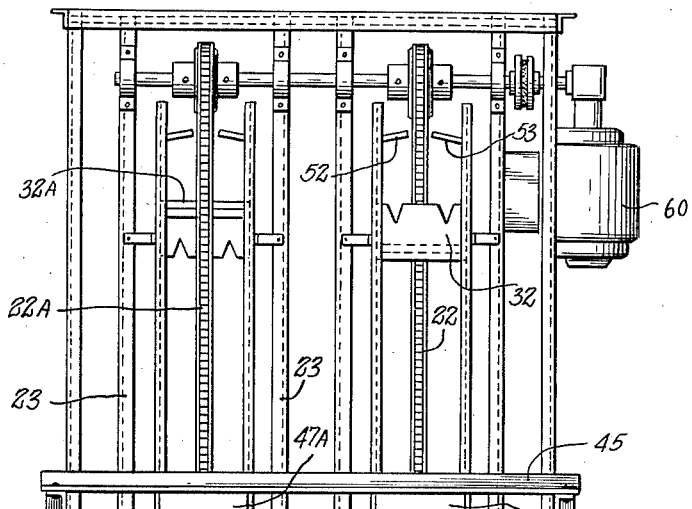
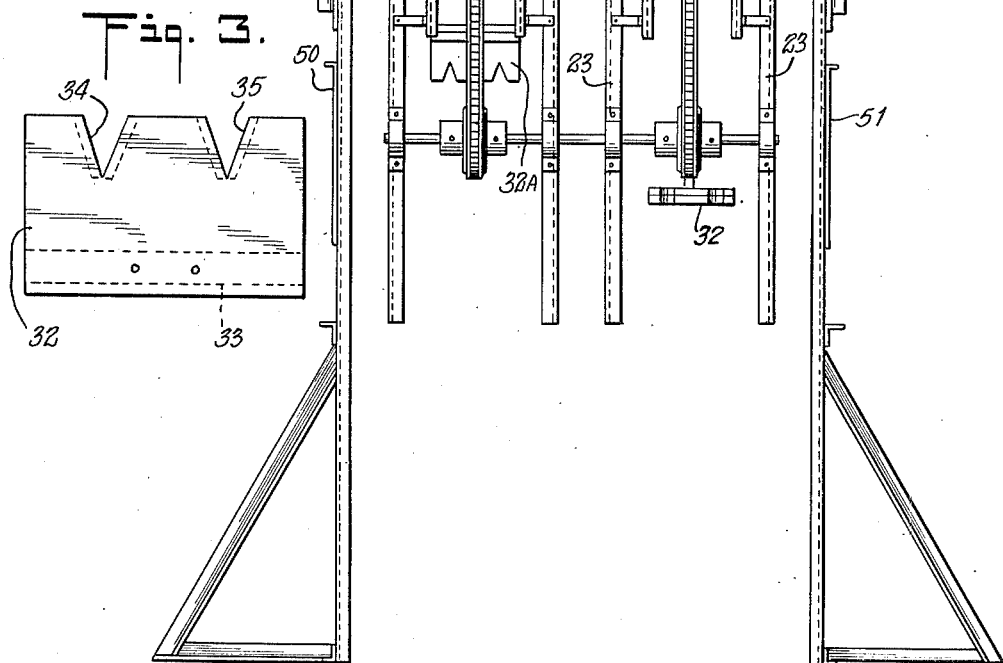
INVENTOR.
AMMON W. STAUFFER
BY
ATTORNEY

United States Patent Office 2,705,339
Patented Apr. 5, 1955

2,705,339

TENDON EXTRACTOR FOR FOWL

Ammon W. Stauffer, Terre Hill, Pa.

Application January 6, 1953, Serial No. 329,777

7 Claims. (Cl. 17—11.3)

This invention relates to a tendon extractor for fowl and more particularly to a motor driven device on which fowl may be loaded by means of the feet and in which the device will automatically break the leg bones and pull the sinews from the legs of the fowl.

In the past it has been the custom in preparing fowl, such as a chicken or turkey for human consumption, for the butcher after removing the feathers to decapitate the bird and to remove the legs. To simply cut off the legs would leave the edible portion of the legs full of the tendons or sinews. In order that the bird may be properly prepared for consumption, it has been the habit in butchering to hook or fasten the feet of the bird and with the bird suspended downward, the butcher will break or cut the bone of each leg where the edible portion starts. Then, by pulling the bird downward the butcher would pull the tendons or sinews that remain attached to the non-edible portion of the leg thus removing the objectionable tendons or sinews. Various improvements have been made to assist the butcher in this particular operation of removing the tendons or sinews as in some fowl it is necessary to exert a great deal of force to pull these tendons or sinews. One of the improvements is a stationary plate with a pair of V's cut therein into which the feet or claws of the bird may be quickly and easily inserted and the same operation as above described is performed. A still further improvement to this device is to provide one stationary plate with two V's cut therein and a moveable plate with two V's cut therein, the moveable plate mounted on a lever so that a great deal of force may be exerted on the movable plate. In this instance the claws or feet of the bird are mounted as above stated and the moveable plate is wedged by means of the V's against the edible portion of the leg of each bird. As the one plate is moved away from the stationary plate, the tendons or sinews are pulled from the legs of the bird. A further improvement over the above described device is to provide a foot pedal to operate the lever supporting the movable plate. It is apparent that all of the devices of the prior art provide a slow and tedious operation and require a great deal of exertion on the part of the operator.

It is an object of this invention to provide a power operated device that will both break the leg bones of a fowl and pull the tendons or sinews therefrom.

A further object of this invention is to provide a power operated endless chain device that permits the loading of one bird after another as long as the device is operated with little exertion on the part of the operator and in which the device automatically breaks the bones of the legs of the bird and pulls the tendons or sinews therefrom.

A still further object of the present invention is to provide a tendon puller for fowl in which power is provided to an endless chain and in which oppositely disposed W plates are provided, one affixed to the movable chain and one affixed in a stationary position so that the fowl may be hung by means of the feet or claws to the movable plate while the stationary plate will prevent the passage of the fowl beyond a predetermined point thus permitting the movable plate to pull the tendons or sinews from the legs of the fowl.

A further object of this invention is to provide a tendon puller for fowl in which power is provided to an endless chain and in which oppositely disposed W plates are provided, a plurality of W plates affixed to the endless chain in spaced relationship while the oppositely disposed W plate is affixed in a stationary position so that the fowl may be hung by means of the feet or claws to the movable plates while the stationary plate will prevent the passage of each fowl beyond a predetermined point thus permitting the movable plates to pull the tendons or sinews from the legs of the fowl.

A further object of this invention is to provide a tendon puller for fowl in which power is provided to a pair of endless parallel chains and in which oppositely disposed W plates are provided for each chain, a W plate is affixed to each endless chain in staggered relation to each other while the oppositely disposed W plates are affixed in a stationary position in alignment with each chain so that one bird may be loaded on one chain and move into engagement with the stationary mounted oppositely disposed plate for extracting the tendons or sinews while a second bird is being loaded on the parallel chain for a similar operation.

A further object of this invention is to provide a tendon puller for fowl in which power is provided to a pair of endless parallel chains and in which oppositely disposed W plates are provided for each chain, a plurality of W plates affixed to each endless chain in spaced relationship and in which each mounted plate is spaced in staggered relationship to the plates on the parallel chain while the oppositely disposed W plates are affixed in a stationary position in alignment with each chain so that one bird may be loaded on one chain and move into engagement with the stationary mounted oppositely disposed plate for extracting the tendons or sinews while a second bird is being loaded on the parallel chain for a similar operation.

Other objects of this invention shall be apparent by reference to the accompanying detailed description and the drawings in which Fig. 1 is a front elevational view of the tendon pulling machine, Fig. 2 is a side elevational view of Fig. 1 shown partially in cross section, Fig. 3 is a plan view of a W plate, and Fig. 4 is a partial view in front elevation of another embodiment of this invention.

Referring to Fig. 1 there is illustrated a tendon pulling device 10 which is comprised of a supporting framework 11 constructed of four upright channels 12 spaced in rectangular formation and joined at the upper end by channels 14 on either side thereof and by channels 15 on the front and back thereof while the base of channels 12 are joined on the sides by channels 16, channels 16 being much wider than the spacing of channels 12 to provide a supporting base. A channel 17 is affixed or welded to channel 16 and extends at right angles thereto. An angular supporting channel 18 is affixed or welded to the outer end of channel 17 while the opposite end of channel 18 is affixed or welded to a channel 20 while channel 20 at either end thereof is affixed or welded at each end to the main frame channels 12. This base and supporting structure is provided on each side of the framework 11. Thus a rigid upright framework is provided to support an endless chain 22 suspended within the framework. The endless chain 22 is suspended by means of a pivotally hung pair of beams or channels 23. The swinging beams 23 are spaced apart a predetermined distance and mounted between channels 12. The swinging beams 23 are supported by a shaft or pivotally supporting pin 25 mounted in the upper end of the rear pair of channels 12. The swinging beams 23 may be retained in their spaced relationship in various ways but in the embodiment illustrated the beams 23 may be welded directly to pin 25 and pin 25 in turn will be supported in a pair of apertures 26A at either end of pin 25 in channels 12. Thus, pin 25 cannot shift to either side and the swinging beams 23 will be retained in a swinging position directly in the center of the framework. The pair of swinging beams 23 support a pair of rotary shafts 26 and 27 mounted at opposite ends of the swinging beams 23. Shafts 26 and 27 may be supported by bearings 28 affixed to the swinging beams 23. Shafts 26 and 27 are provided with sprockets 29 and 30 respectively mounted on a central axis in alignment with each other. The endless chain 22 is mounted about sprockets 29 and 30 and adjusted to a taut relationship with sprockets 29 and 30. A plate 32 as illustrated in Fig. 3 is provided to be mounted to a link of the endless chain 22. Plate 32 is provided generally W in shape. The V portions 34 and 35 of the W may be slightly spaced apart so that a pair of claws or feet of a bird can be readily affixed in each of the V portions. The W shaped plate 32 as illustrated in Fig. 2 is provided with a base portion 33 to retain the W shaped portion parallel to the link of the chain but spaced slightly therefrom so that the claws or feet of the bird suspended by means of the plate will fit between the plate and the chain without interfering with the movement of the links of the chain. In order that plate 32 will remain in the position illustrated in Figs. 1 and 2 while being carried upward by the endless chain 22, there are provided a pair of channel guides 36 and 37. Guides 36 and 37 are mounted between the swinging beams 23 in a rigidly supported position by members 38 and spaced apart so that plates 32 will ride within the channel guides and any bending or twisting of plate 32 while moving between the guiding channels will be corrected yet permit the plate 32 to slide freely upward with the movement of the endless chain 22. The framework 11 is provided with a pair of movable arms or channels 40 mounted on either side thereof. The arms 40 are slideably mounted, each arm being provided with a pair of elongated apertures 41 and 42. Bolts or pins 43 and 44 are passed through these elongated apertures and affixed to the upright channels 12 to retain the arms 40 in a slideable position adjacent to either side of the frame 11. Arms 40 extend out in front of the framework and the endless chain and are provided with a cross beam 45. The cross beam 45 provides the means of mounting a stationary inverted W plate 47. Plate 47 is similar to plate 32 but mounted in an oppositely disposed relationship. Plate 47 is also positioned so that the V openings 48 and 49 of the W are in alignment with the V openings 34 and 35 of plate 32. Guard plates 50 and 51 may be provided on either side of shaft 27 and plates 50 and 51 are preferably mounted to channels 12. The plates are mounted in this area as this is the area in which the birds are loaded or affixed to the moving W plate 32. A pair of tripper fingers 52 and 53 are provided at the upper end of the endless chain and are mounted to either side of the upper ends of the guides 36 and 37. The fingers 52 and 53 must extend from the guides 36 and 37 so that the ends of the fingers are adjacent to the endless chain 22, also the fingers are positioned so that they practically rub or touch the inner face of the W plate as it moves over the fingers. It is apparent that when the W plate approaches the fingers 52 and 53 the claws or feet will abut with these fingers and be stopped in their upward movement by the fingers. Since the claws are only retained in the V slots by the sinews that have been pulled out of the bird, it is apparent that since the fingers 52 and 53 prevent the upward movement of the claws they will hold the claws while pulling the sinews through the V slots and the claws and appendages or sinews will be pulled out of or tripped from the V apertures of the W plate. Referring to Fig. 1 it is to be noted that shaft 26 is provided with a coupling 55 at one end thereof and a stub shaft 56 is mounted on the opposite side of coupling 55. At the opposite end of the stub shaft 56 a pinion gear 57 is affixed. Gear 57 meshes with and is driven by a second pinion gear 58. Gear 58 is mounted on a shaft 59 which may be connected by means of gearing (not shown) to a motor 60. The gearing (not shown) is simply utilized to reduce the drive speed of the motor 60 and increase the power provided to shaft 26 and sprocket 29. Except for this necessity, shaft 59 might be connected directly to the motor shaft of motor 60. Motor 60 is in turn mounted by means of a block 61 to the one side of the swinging beams 23 being affixed to one of the beams 23. Thus it is apparent that motor 60 and its connecting gears and shafting will swing with the swinging beams 23 yet provide the necessary power to drive the endless chain 22. Motor 60 may be connected by a power line and switch to a source of power. Referring to Figs. 1 and 2 it is apparent that motor 60 by means of the gearing and shafts illustrated will drive sprocket 29 and sprocket 29 in turn will drive the endless chain 22. The direction of rotation of chain 22 is necessarily counter-clockwise as illustrated in Fig. 2 so that the front length of the chain will move upward. It is further apparent that the movable W plate must be affixed to a link of the chain so that plate 32 is positioned on the exterior of the chain to rotate freely about both sprockets. Referring to Fig. 2 it would appear that the W plate 47 would prevent the passage of plate 32 in its upward movement. However plate 47 is positioned with the slots 41 and 42 so that as the upper edge of plate 32 abuts with the lower edge of plate 47, plate 47 will move outward as it is slidably mounted to move outward with the push of the rising plate 32 thus allowing plate 32 to pass. Actually the plates are designed to induce this particular movement and in some instances the protruding claws or legs of the bird actually assist in pushing the plate 47 outward (that is enough to allow the plates to pass each other). However plate 47 by means of the slideable beams 40 tends to slip backward and thus grips or digs the V portions 48 and 49 into the soft meat edible portion of either leg of the bird and thus prevents the passage of the bird past plate 47. With the plate 47 gripping the meaty or edible portion of the legs as the plate 32 moves upward the tension or pull on the legs increases. Due to the prying action created by plate 47 and arms 40 (plate 32 moves upward at an angle to plate 47 and plate 47 moves outward with the increased tension) the bones of the legs will be snapped where the V aperture grips the joint adjacent to the edible portion of the leg (this being the point where the greatest force is applied and being the weakest portion of the leg). Plate 32 will continue to move upward pulling the tendons or sinews of the legs out of the edible portion of the leg thus the remaining carcass of the bird will drop downward and the plate 32 moves upward until the feet or claws abut with the tripping fingers 52 and 53 where the claws or feet will be removed from plate 32. Thus plate 32 continues on the endless chain 22 and repeats the cycle as the next bird is loaded thereon. There may be a plurality of plates 32 mounted on the endless chain 22 without departing from the spirit of this invention.

Referring to Fig. 4 it is apparent that the further embodiment illustrated in this figure is similar to Fig. 1 except that there are provided two pairs of swinging beams 23 with endless chains 22 and 22A. Thus there is provided a device in which two endless chains are operating simultaneously and in this device plate 32 will be mounted to chain 22 while a similar plate 32A will be mounted to chain 22A. However, the relationship of plate 32 to plate 32A is staggered so that when a bird has been loaded on plate 32 and the bird continues upward and is engaged by plate 47 while the device is breaking the leg bones and pulling the tendons from the loaded bird, the plate 32A will be in a position between the guards 50 and 51 ready for the loading of a second bird. Thus the device may be speeded up in its operation. Similarly there may be provided a plurality of plates 32 in spaced relation on the endless chain 22 and a plurality of plates 32A in spaced relation on the endless chain 22A to operate in exactly the same fashion, but to increase the production of the device. Likewise the plates on chain 22 will be in a staggered relation to the plates on chain 22A. Thus with the additional plates 32 and 32A the device will be continuously loaded as each plate passes between the guards 50 and 51 and each bird will in turn be gripped at the predetermined position by the plates 47 and 47A to thus break the leg bones and pull the tendons from the edible portion of the leg. With a machine of the type described in this embodiment the butchering is considerably facilitated and a greater quantity of birds may be prepared with this machine in a shorter interval of time.

Various changes may be made to the general construction of this machine as long as an endless chain is provided carrying means to attach the claws or feet of a bird while a stationary or adjustable means is provided to grip the edible portion of the bird without departing from the spirit of this invention and this invention shall be limited only by the appended claims.

What is claimed is:

1. In a tendon extractor for fowl, a supporting framework, a power operated means in said framework, a first supporting element for both feet of a fowl, said supporting element attached to said power means and moveable in a single plane, a second element positioned in substantially the same plane as the first element but lying normal thereto, said second element moveable in the plane normal to said first element to allow said first element to pass by, said second element provided with means to engage the edible portion of each leg of said fowl, whereby the tendons of the fowl are extracted when the first element moves away from said second element.

2. In a device according to claim 1 in which said first supporting element comprises a W plate and said second element comprises an inverted W plate.

3. In a tendon extractor for fowl, a supporting framework, a power operated means comprising an endless chain in said framework, a plurality of moveable W plates mounted on said endless chain in spaced relation, each plate utilized for supporting both feet of a fowl, said W plates moveable in a single plane, a substantially stationary inverted W plate positioned in approximately the same plane as the moveable W plates but lying normal thereto, said inverted W plate moveable in the plane normal to said moveable W plates to allow the moveable W plates to pass by the substantially stationary inverted W plate, said inverted W plate provided with means to engage the edible portion of each leg of said fowl whereby the tendons of the fowl are extracted when the moveable W plate moves away from said substantially stationary inverted W plate.

4. In a device according to claim 3 in which a pair of ejecting fingers are mounted adjacent to the endless chain and each ejecting finger projecting into the path of movement of the W plates.

5. In a tendon extractor for fowl a supporting framework, a pair of power operated means in said framework, a pair of first supporting elements for both feet of a fowl, each supporting element attached to one of said power means and moveable in a single plane, a pair of second elements positioned in substantially the same plane as the first elements but lying normal thereto, said second elements moveable in the plane normal to said first elements to allow said first elements to pass by, said second element provided with means to engage the edible portion of each leg of a fowl, whereby the tendons of each fowl are extracted when a first element moves away from its related second element.

6. In a device according to claim 5 in which there are a plurality of first supporting elements attached to each power means, said supporting elements of one power operated means being positioned in staggered relation to the first supporting elements of the other power operated means.

7. In a tendon extractor for fowl an upright supporting framework, a pair of hanging beams mounted at one end thereof to the upper portion of said framework, said hanging beams supporting a pair of shafts one at each end of said beams, a sprocket mounted on and affixed to each shaft centrally between said beams and in alignment with each other, an endless chain supported on said sprockets to rotate about same, a plurality of moveable W plates mounted on said endless chain in spaced relation, a motor attached to one of said shafts to drive said endless chain, a cross beam slideably mounted on said framework to move outwardly in a plane normal to the plane of said endless chain, a substantially stationary inverted W plate affixed to said cross beam to lie normal to and adjacent to said endless chain so that the V's of the said stationary inverted W plate lie in alignment with the V's of the W plates mounted on said endless chain, whereby the tendons of a fowl are extracted when a moveable W plate carrying a fowl moves away from said inverted W plate.

References Cited in the file of this patent

UNITED STATES PATENTS 2,278,162    Courlang et al. _____ Mar. 31, 1942